April 8, 1924.  1,489,709

L. F. O'FLAHERTY ET AL

MIXING VALVE

Filed Oct. 23, 1922  3 Sheets-Sheet 1

Witnesses:

Inventors:
Leo F. O'Flaherty &
William L. Kirkpatrick
By Joshua R. H. Potts
Their Attorney April 8, 1924.  1,489,709

L. F. O'FLAHERTY ET AL

MIXING VALVE

Filed Oct. 23, 1922  3 Sheets-Sheet 3

Witnesses:

Inventors:
Leo F. O'Flaherty &
William L. Kirkpatrick.
By Joshua R. H. Potts
Their Attorney Patented Apr. 8, 1924.

1,489,709

UNITED STATES PATENT OFFICE.

LEO F. O'FLAHERTY AND WILLIAM L. KIRKPATRICK, OF ELGIN, ILLINOIS.

MIXING VALVE.

Application filed October 23, 1922. Serial No. 596,219.

*To all whom it may concern:*

Be it known that we, LEO F. O'FLAHERTY and WILLIAM L. KIRKPATRICK, citizens of the United States, and residents of Elgin, county of Kane, and State of Illinois, respectively, have invented certain new and useful Improvements in Mixing Valves, of which the following is a specification.

Our invention relates to new and useful improvements in mixing valves, especially such as are used on bath-tubs, basins, sinks, etc., and has for its object to provide an efficient and inexpensive mixing valve constructed from a minimum of parts and which will mix hot and cold water to any degree of temperature to suit the user.

Another object is to provide a strong and compact valve by making its inlet control means, its discharge control means and its operating threads all integral with the valve stem.

Other objects will appear hereinafter.

The invention consists in the combinations and arrangements of parts hereinafter described and claimed.

The invention will be best understood by reference to the accompanying drawings forming a part of this specification, and in which, Fig. 1, is a vertical section through the valve with the hot water port full open and the cold water port closed;

Figure 2:
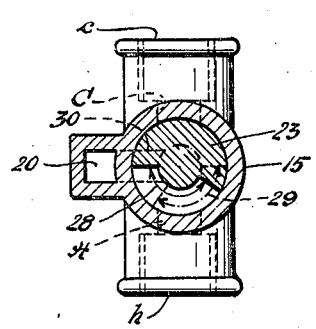
Fig. 2, is a horizontal section taken on line 2—2 of Fig. 1.
Figure 4:
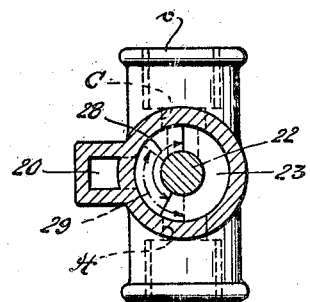
Fig. 4, is a horizontal section taken on line 4—4 of Fig. 3.
Figure 1:
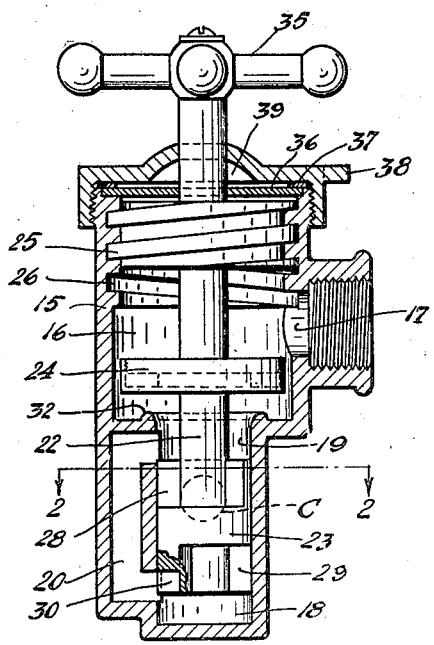
Figure 3:
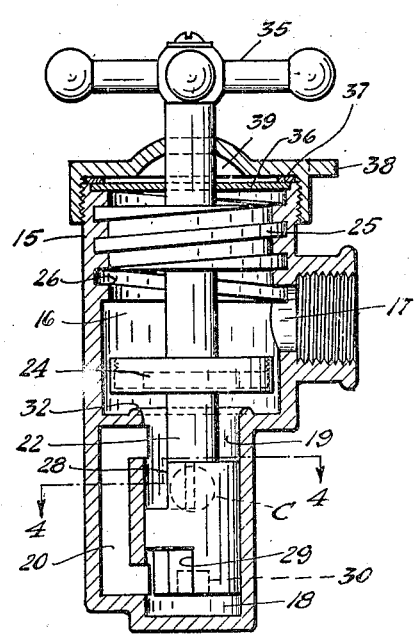
Fig. 3, is a vertical section through the valve with both the hot and cold water ports half open.
Figure 6:
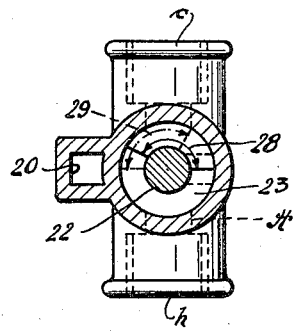
Fig. 6, is a horizontal section taken on line 6—6 of Fig. 5.
Figure 8:
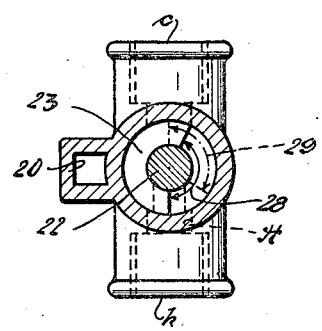
Fig. 8, is a horizontal section through the valve taken on line 8—8 of Fig. 7.
Figure 5:
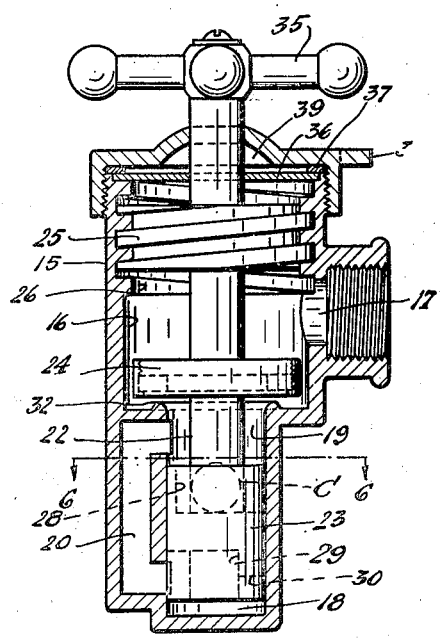
Fig. 5, is a vertical section through the valve with the cold water port full open and the hot water port closed.

The preferred form of our invention, as illustrated in Figs. 1 to 10, comprises a casing 15 having in its lower portion a contracted receiving chamber opening upwards into a discharge chamber 16 provided with a discharge opening 17. The receiving chamber is provided with a hot water inlet (H) at its lower end leading from the threaded extension ($h$) to a receiving space 18, and with a cold water inlet (C) leading from the threaded extension ($c$) into the upper end of said chamber which constitutes a mixing chamber 19. A by-pass 20 is formed in the side wall of the casing and connects the space 18 with mixing chamber 19.

To simplify the valve construction, the main movable members are made in one casting, thus, the stem 22 is formed integral with the inlet control means or core 23, with the discharge control means or sealing valve 24, and with the operating threads 25, said threads engaging in threaded grooves 26 provided in the upper portion of the casing.

The core 23 is provided with an upper peripheral pocket 28 registerable with the cold water inlet (C) and opening directly into the mixing chamber 19, said core is further provided with a lower peripheral pocket 29 registerable with the hot water inlet (H) and opening directly into the receiving space 18. Said core is also provided with a notch 30 at its lower edge (see Fig. 1), which connects space 18 with by-pass 20 when pocket 29 is turned out of registry with said by-pass.

The sealing valve 24 is provided with a compression gasket 31 (see Fig. 7) to engage an annular rib 32 formed at the upper end of the mixing chamber 19, and a collar 33 retains said gasket in position on the valve.

Figure 7:
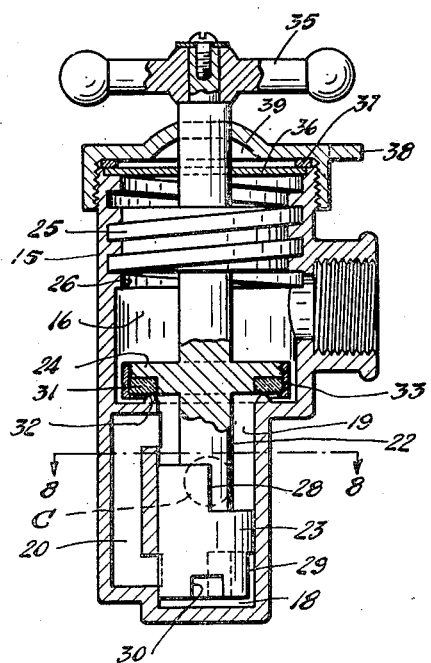
Fig. 7, is a vertical section through the valve taken on line 7—7 of Fig. 9, with both the hot and cold water ports closed, and the sealing valve also closed.
Figure 9:
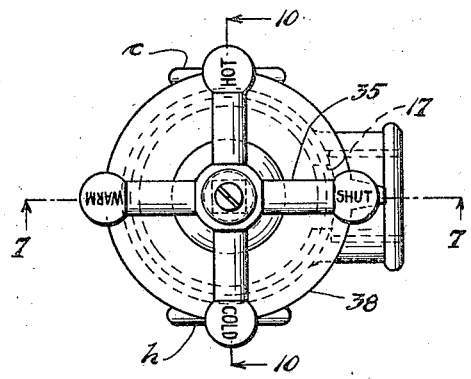
Fig. 9, is a plan view of the device with the valve closed.

A handle 35 is detachably mounted on the stem for rotating the stem, as shown in Fig. 7, or in any other suitable manner, and the top of the casing is sealed by means of a disc 36, gasket 37 and cap 38, a space 39 being provided in the cap to receive the suitable packing.

Figure 12:
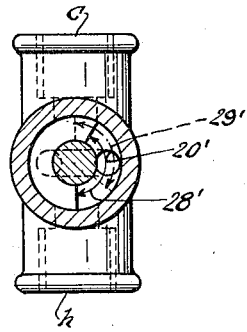
Fig. 12, is a horizontal section taken on line 12—12 of Fig. 11.
Figure 10:
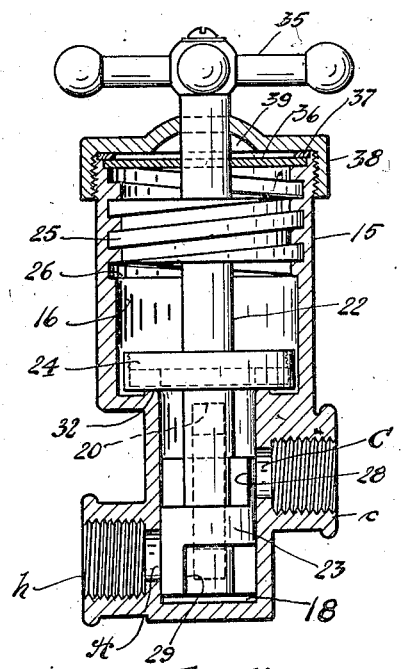
Fig. 10, is a vertical section through the valve taken on line 10—10 of Fig. 9.
Figure 11:
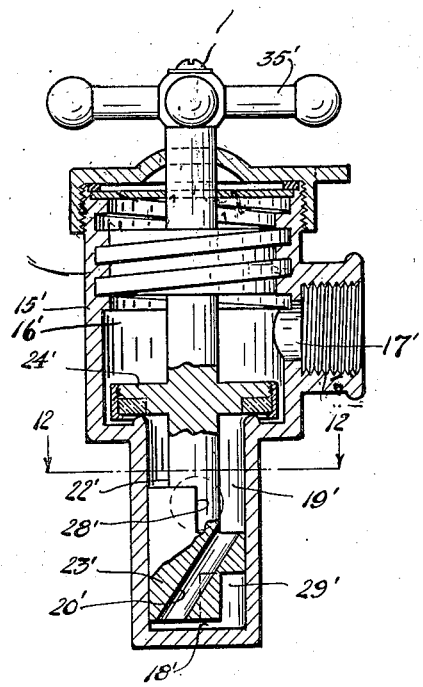
Fig. 11, is a vertical section through a modified form of valve.

The form shown in Figs. 11 and 12 is similar to the one above described, as regards the discharge chamber 16', outlet 17', receiving space 18', mixing chamber 19', stem 22', sealing valve 24', operating threads 25', handle 35', etc., but the by-pass is omitted from the casing 15' which is therefore contracted at its lower end, and the by-pass 20' is formed through the core 23' of this valve connecting the pockets 28' and 29'. This type of valve is especially suitable for the smaller sizes, and where the lower portion of the valve is required to be contracted.

It is apparent from the above description and the drawings that the valve casing in this device consists of one member and that the main operating members of the movable valve mechanism also consist of one member, in other words that the main valve elements of this device consist of only two separate castings; and furthermore that this valve may be readily set in order to mix the hot and cold water to any desired degree of temperature, and that when the valve is closed, the mixing chamber will be sealed by means of the sealing valve firmly engaging the annular rib 32, thereby positively preventing the leakage of the valve to the discharge chamber and outlet.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent, is:

1. A mixing valve comprising a plurality of inlets and an outlet chamber with an outlet, a mixing chamber connected with one of said inlets, a by-pass leading from the other inlet to said mixing chamber, valve means in said mixing chamber for controlling communication between said inlets and said mixing chamber, and valve means in said outlet chamber for sealing communications between said mixing chamber and said outlet.

2. A mixing valve comprising a casing, a plurality of inlets and an outlet on said casing, a mixing chamber connected directly with one of said inlets, a by-pass in the wall of said casing and connecting the other inlet with said mixing chamber, and valve means for controlling communication between said inlets and mixing chamber and between said chamber and outlet.

3. A mixing valve comprising a casing provided with hot and cold water inlets and an outlet, a mixing chamber connected directly with one of said inlets, a by-pass in the wall of said casing connecting the other of said inlets with said mixing chamber, valve means for selectively controlling communication between said inlets and said chamber, and a sealing valve integral with said valve means for controlling communication between said chamber and the outlet.

4. A mixing valve comprising a casing having an outlet and provided with a contracted lower portion with hot and cold water inlets, a mixing chamber provided in the upper part of said contracted portion, a by-pass formed on the side of said contracted portion and connecting one inlet with said chamber, and valve means for selectively controlling communication between said inlets and said chamber.

5. A mixing valve comprising a plurality of inlets and an outlet, a by-pass affording communication between said inlets, a valve stem and integral means thereon controlling communication between said inlets, a mixing chamber affording communication from said inlets and by-pass to the outlet, and valve means on said stem movable with but spaced from the first said valve means for controlling the last said communication.

6. A mixing valve comprising a plurality of inlets and an outlet, a valve core provided with pockets to communicate with said inlets, a by-pass affording communication between such pockets, a mixing chamber communicating with said by-pass, and a sealing valve controlling communication between said mixing chamber and outlet.

7. A mixing valve comprising a plurality of inlets and an outlet, a valve core provided with pockets registerable with said inlets, a mixing chamber communicating directly with one of said pockets, a by-pass for connecting another pocket with said mixing chamber, and valve means for controlling communication between said mixing chamber and said outlet.

8. A mixing valve comprising a casing, inlets and an outlet on said casing, a valve core provided with a pocket for each inlet, a mixing chamber above said core in open communication with one of said pockets, a by-pass in said casing leading into said mixing chamber and registerable with said other pocket, and a valve member integral with said core for closing said mixing chamber.

9. A mixing valve comprising a casing, inlets and an outlet on said casing, a valve core provided with a pocket for each inlet, a mixing chamber in open communication with one of said pockets, a space in open communication with the other of said pockets, a by-pass in said casing opening into said mixing chamber, and registerable with said other pocket, and a notch in said core for connecting said by-pass with said space.

10. A mixing valve comprising a casing, inlets and an outlet on said casing, a valve core provided with a pocket for each inlet, a mixing chamber in open communication with said pockets, a space in open communication with the other of said pockets, a by-pass in said casing in open communication with said mixing chamber and registerable with said space, and a sealing valve constructed integral with said core for closing communication between said mixing chamber and the outlet.

11. A mixing valve comprising inlets and an outlet, a stem having a solid valve core and sealing means formed integral therewith, a mixing chamber, and passages including a by-pass for connecting said inlets with said mixing chamber, communication through said passages being controlled by said core, and said mixing chamber being closable by said sealing means.

12. A mixing valve comprising hot and cold water inlets and an outlet, a valve stem having operating threads and a sealing valve and a valve core integral therewith, a mixing chamber closable by said sealing valve, a by-pass, a space in said core connecting one inlet with said chamber and a second space connecting the other inlet with said by-pass and said chamber, and means on said stem for setting the valve to mix the water at any suitable temperature.

13. A mixing valve comprising a casing having inlets and an outlet, a discharge chamber connected with said outlet, a mixing chamber connected with said discharge chamber, a by-pass in said casing connecting said mixing chamber with the lower part of said valve, a valve stem having an integral sealing valve for closing connections between said mixing chamber and discharge chamber, a valve core integral with said stem and provided with a pocket connecting one inlet with said mixing chamber and another pocket connecting the other inlet with said by-pass, and threaded means integral with said stem for setting said valve to provide the desired mixing of the fluids from said inlets.

14. A mixing valve comprising a casing having its inlet portion, mixing portion, and discharge portion constructed in one casting and having a wall passage connecting said inlet and mixing chamber, said valve having movable mechanism which includes inlet control means, discharge control means, and an operating stem all formed integral.

15. A mixing valve comprising a casing having its inlet portion, mixing portion, discharge portion and operating threads constructed in one casting, said valve having movable mechanism which includes a stem, operating threads thereon, a solid inlet control core, and a sealing valve for closing the mixing chamber, all formed integral.

In testimony whereof we have signed our names to this specification in the presence of two subscribing witnesses.

LEO F. O'FLAHERTY.
WILLIAM L. KIRKPATRICK.

Witnesses:
JAS. G. SPILLARD,
FRANK M. O'FLAHERTY.